(12) United States Patent
Sandstrom et al.

(10) Patent No.: US 8,918,537 B1
(45) Date of Patent: Dec. 23, 2014

(54) STORAGE ARRAY NETWORK PATH ANALYSIS SERVER FOR ENHANCED PATH SELECTION IN A HOST-BASED I/O MULTI-PATH SYSTEM

(75) Inventors: Harold M. Sandstrom, Belmont, MA (US); Amanuel Ronen Artzi, Framingham, MA (US); Michael E. Bappe, Loveland, CO (US); Helen S. Raizen, Jamaica Plain, MA (US); William Zahavi, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 1935 days.

(21) Appl. No.: 11/819,609

(22) Filed: Jun. 28, 2007

(51) Int. Cl.
G06F 5/00 (2006.01)

(52) U.S. Cl.
USPC .......... 709/238; 709/223; 709/224; 709/230; 711/114; 711/118; 711/130

(58) Field of Classification Search
None
See application file for complete search history.

(56) References Cited

U.S. PATENT DOCUMENTS

| | | | |
|---|---|---|---|
| 7,111,084 B2 | 9/2006 | Tan et al. | |
| 7,260,628 B2* | 8/2007 | Yamamoto et al. | 709/224 |
| 7,307,948 B2 | 12/2007 | Infante et al. | |
| 7,349,961 B2 | 3/2008 | Yamamoto | |
| 7,370,241 B2 | 5/2008 | Nicholson et al. | |
| 7,376,764 B1 | 5/2008 | Todd | |
| 7,406,039 B2 | 7/2008 | Cherian et al. | |
| 7,409,586 B1 | 8/2008 | Bezbaruah et al. | |
| 7,565,570 B2 | 7/2009 | Dohi | |
| 7,617,320 B2* | 11/2009 | Alon et al. | 709/229 |
| 7,707,151 B1 | 4/2010 | Blumenau et al. | |
| 2002/0080445 A1* | 6/2002 | Falkenstein et al. | 359/127 |
| 2002/0156918 A1* | 10/2002 | Valdevit et al. | 709/238 |
| 2003/0210416 A1 | 11/2003 | Lewis et al. | |
| 2003/0236074 A1* | 12/2003 | Ishii et al. | 455/69 |
| 2004/0210656 A1 | 10/2004 | Beck et al. | |
| 2004/0260736 A1 | 12/2004 | Kern et al. | |
| 2005/0073998 A1* | 4/2005 | Zhu et al. | 370/352 |
| 2005/0188126 A1* | 8/2005 | Mashima et al. | 710/36 |
| 2005/0262562 A1 | 11/2005 | Gassoway | |
| 2006/0034181 A1 | 2/2006 | Noguchi et al. | |
| 2006/0165002 A1 | 7/2006 | Hicks et al. | |
| 2006/0209707 A1 | 9/2006 | Nakaya et al. | |
| 2006/0253526 A1* | 11/2006 | Welch et al. | 709/200 |
| 2007/0055797 A1 | 3/2007 | Shimozono | |

(Continued)

OTHER PUBLICATIONS

"Introduction to Storage Area Networks"—Cisco, Jul. 2006 https://learningnetwork.cisco.com/...1.../IntroductiontoSANs.pdf.*

(Continued)

*Primary Examiner* — Randy Scott
(74) *Attorney, Agent, or Firm* — Daly, Crowley, Mofford & Durkee, LLP

(57) ABSTRACT

Systems and methods are provided for selecting a path through which to send data in a host-based multi-path system. In one embodiment, a system includes a management server that determines a topology of the network and analyzes a plurality of paths for sending data through the network. The management server may also create a path quality index based on the topology and the analysis, the path quality index indicating a quality of individual paths within the plurality of paths. The system further includes a host that receives the path quality index from the management server and automatically selects, based on the path quality index, a path from the plurality of paths through which to send data.

14 Claims, 2 Drawing Sheets

(56) References Cited

U.S. PATENT DOCUMENTS

| | | | |
|---|---|---|---|
| 2007/0093124 A1 | 4/2007 | Varney et al. | |
| 2007/0112974 A1 | 5/2007 | Shirogane et al. | |
| 2007/0153683 A1* | 7/2007 | McAlpine | 370/229 |
| 2007/0169186 A1 | 7/2007 | Ueoka et al. | |
| 2007/0234113 A1* | 10/2007 | Komatsu et al. | 714/8 |
| 2008/0228987 A1 | 9/2008 | Yagi et al. | |
| 2009/0257361 A1* | 10/2009 | Deshpande et al. | 370/252 |

OTHER PUBLICATIONS

U.S. Appl. No. 11/819,612, filed Jun. 28, 2007, file through Jan. 27, 2009, 67 pages.

http://enterprise.symantec.com, Data Sheet: Storage Management, Veritas CommandCentral™ Storage by Symantec, Centralized Visibility and Control Across Heterogeneous Storage Environments, pp. 1-4.

Sanscreen®, The Engabler for Storage Service Management, Jan. 2006.

U.S. Appl. No. 11/819,612, filed Jun. 28, 2007, file through Jun. 2, 2010, 205 pages.

RSA Technology Solution Brief: Powerpath® Encryption with RSA: The EMC Solution for Securing Data in Enterprise Storage, 16 pages.

U.S. Appl. No. 11/819,612, filed Jun. 28, 2007 file from Jun. 2, 2010 through Oct. 6, 2010, 34 pages.

U.S. Appl. No. 11/819,611, filed Jun. 28, 2007 file through Oct. 6, 2010, 240 pages.

* cited by examiner

STORAGE ARRAY NETWORK PATH ANALYSIS SERVER FOR ENHANCED PATH SELECTION IN A HOST-BASED I/O MULTI-PATH SYSTEM

TECHNICAL FIELD

The present invention generally relates to the field of enterprise path management. More particularly, the invention relates to systems and methods for enhanced path selection in a host-based I/O multi-path system.

BACKGROUND INFORMATION

Enterprise storage systems store data in large-scale environments and differ from consumer storage systems in both the size of the environment and the types of technologies that store and manage the data. A large-scale environment that stores data is typically referred to as a storage area network (SAN). SANs are commonly used in enterprise storage systems to transfer data between computer systems and storage devices. A typical SAN provides a communication infrastructure, including physical connections between computer systems, storage devices, and a management layer, which organizes the connections, storage devices, and computer systems.

In a SAN environment, computer systems, typically referred to as hosts, connect to the SAN via one or more host bus adapters. In the case of a Fibre Channel SAN, the physical connections between hosts and storage devices may include special Fibre Channel host bus adapters, Fibre Channel switches, Fibre Channel routers, and optical fiber.

Storage devices may include multiple disk drives that combine to form a disk array. A typical disk array includes a disk array controller, a cache, disk enclosures, and a power supply. Examples of disk arrays include the SYMMETRIX Integrated Cache Disk Array System the CLARIION Disk Array System, both available from EMC Corporation of Hopkinton, Mass. A disk array controller is a piece of hardware that provides storage services to computer systems that access the disk array. The disk array controller may attach to a number of disk drives that are located in the disk enclosures. For example, the disk drives may be organized into RAID groups for efficient performance. RAID (redundant array of inexpensive disks) is a system that uses multiple disk drives that share or replicate data among the drives. Accordingly, in a RAID system, instead of identifying several different hard drives, an operating system will identify all of the disk drives as if they are a single disk drive.

Disk array controllers connect to a SAN via a port. A port serves as an interface between the disk array controller and other devices, such as the hosts, in the SAN. Each disk array controller typically includes two or more ports. Disk array controllers may communicate with other devices using various protocols, such as the SCSI (Small Computer System Interface) command protocol over a Fibre Channel link to the SAN. In the SCSI command protocol, each device is assigned a unique numerical identifier, which is referred to as a logical unit number (LUN). Further, communication using the SCSI protocol is said to occur between an "initiator" (e.g., a host) and a "target" (e.g., a storage device) via a path. For example, a path may include a host bus adapter, an associated SCSI bus or Fibre Channel cabling, and a single port of a disk array controller.

Management of a path is provided by path management software. Path management software is a host-based software solution that is used to manage SANs and, among other things, can detect load imbalances for disk array controllers in a SAN and can identify alternate paths through which to route data. An example of path management software is EMC POWERPATH by EMC Corporation of Hopkinton, Mass.

Although prior path management software systems may monitor load balances and identify alternate paths through which to route data, a network administrator must evaluate the alternative paths and select which paths to use for routing data. The number of alternate paths and routing decisions that a network administrator must make increases dramatically as the amount of data and number of physical connections between an initiator and a target increase. This may cause a delay in the network administrator selecting an optimal path, and lead to increased costs due to having network administrators perform path selection. Therefore, conventional techniques are limited and suffer from one or more drawbacks.

In view of the foregoing, there is a need for improved systems and methods for selecting paths in a host-based I/O multi-path system.

SUMMARY

Consistent with an embodiment of the present invention, a system is provided for selecting a path through which to send data in a network. In one embodiment, a system includes a management server that determines a topology of the network and analyzes a plurality of paths for sending data through the network. The management server may also create a path quality index based on the topology and the analysis, the path quality index indicating a quality of individual paths within the plurality of paths. The system further includes a host that receives the path quality index from the management server and automatically selects, based on the path quality index, a path from the plurality of paths through which to send data.

Consistent with another embodiment of the present invention, a computer-implemented method is provided for selecting a path through which to send data in a network. The method may include determining a topology of the network and analyzing a plurality of paths for sending data through the network. The method may further include creating a path quality index based on the topology and the analysis, the path quality index indicating a quality of individual paths within the plurality of paths. Moreover, the method may include automatically selecting, based on the path quality index, a path from the plurality of paths through which to send data.

Consistent with another embodiment of the present invention, a computer-readable medium is provided for selecting a path through which to send data in a network. The computer-readable medium may include program code instructions which, when executed by a processor, perform a method that implements the steps discussed above.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Figure 1:
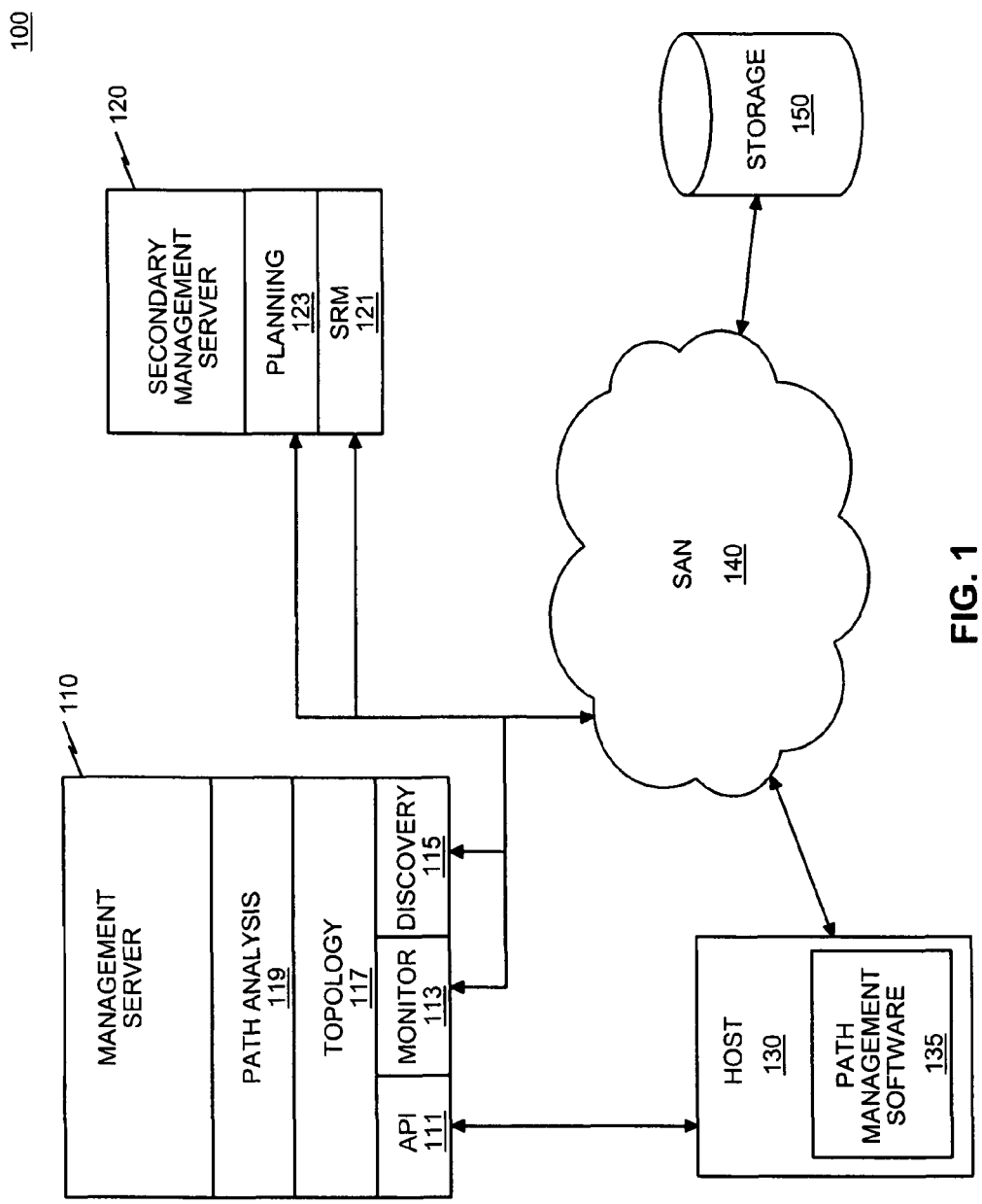
FIG. 1 illustrates an exemplary system for selecting a path through which to send data in a network, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

The methods and apparatus of the present invention are intended for use in storage area networks (SANs) that include data storage systems, such as the SYMMETRIX Integrated Cache Disk Array System or the CLARIION Disk Array System available from EMC Corporation of Hopkinton, Mass. and those provided by vendors other than EMC Corporation.

The methods and apparatus of the present invention may take the form, at least partially, of program code (i.e., instructions) embodied in tangible media, such as floppy diskettes, CD-ROMs, hard drives, random access or read only-memory, or any other machine-readable storage medium, including transmission medium. When the program code is loaded into and executed by a machine, such as a computer, the machine becomes an apparatus for practicing the invention. The methods and apparatus of the present invention may be embodied in the form of program code that is transmitted over some transmission medium, such as over electrical wiring or cabling, through fiber optics, or via any other form of transmission. When implemented on a general-purpose processor, the program code combines with the processor to provide a unique apparatus that operates analogously to specific logic circuits. The program code (software-based logic) for carrying out the method is embodied as part of the system described below.

Overview

Systems and methods consistent with the present invention provide functionality for selecting a path through which to send data in a network. An automatic path selection tool may allow optimal selection of paths based on a path quality index. The path quality index may identify the quality of each available path for transmission of data through the network. A management server may create a path quality index by analyzing a topology of the network and analyzing paths in the network. The management server may use software (e.g., Storage Insight by EMC Corporation) to describe and analyze the topology of a network by modeling components and their relationships and behavior across networks, applications, and storage. In addition, the management server may use software to identify and handle errors and to identify path failures.

The management server may provide the path quality index to a host. The host may use an automatic path selection tool to select a path through which to send data based on the path quality index. The automatic path selection tool may also provide load balancing between paths in a network.

An administrator at a host may access the management server via, for example, an application that exposes a graphical user interface (GUI). The administrator may view the paths selected by the automatic path selection tool and override the selections based on the administrator's knowledge. The management server application may also include a GUI to allow an administrator to access, for example, a display of the network topology.

System Architecture

FIG. 1 illustrates an exemplary system 100 for selecting a path through which to send data in a network, such as SAN 140, consistent with an embodiment of the present invention. As shown in system 100, management server 110, secondary management server 120, host 130, and storage 150 are connected to SAN 140. One of ordinary skill in the art will appreciate that although one management server, one secondary server, one host, and one storage module are depicted in FIG. 1, any number of servers, hosts, and storage modules may be provided. Furthermore, one of ordinary skill in the art will recognize that functions provided by one or more components of system 100 may be combined.

SAN 140 provides communications between the various entities in system 100, such as management server 110, secondary management server 120, host 130, and storage module 150. SAN 140 may be a shared, public, or private network and encompasses a wide area or local area. SAN 140 may be implemented through any suitable combination of wired and/or wireless communication networks. Furthermore, SAN 140 may include a local area network (LAN), a wide area network (WAN), an intranet, or the Internet.

Management server 110 may comprise a general purpose computer (e.g., a personal computer, network computer, server, mainframe computer, or virtual machine) having a processor that may be selectively activated or reconfigured by a computer program to perform one or more methods consistent with the present invention. Management server 110 may be implemented in a distributed network. Alternatively, management server 110 may be specially constructed for carrying-out methods consistent with the present invention. Furthermore, management server 110 may include one or more components, such as a random access memory (RAM) module, a read-only memory (ROM) module, a database, one or more input/output (I/O) devices, and a network interface, such as Application Program Interface (API) 111. Management server 110 may include any type of mass storage device configured to store information, such as magnetic and/or optical disk devices, such as hard drives, CD-ROMs, DVD-ROMs, or any other type of mass media device. Management server 110 may include additional, fewer, and/or different components than those listed above, as the components listed above are exemplary.

API 111 may include one or more components configured to transmit and receive data via a communication network, such as the Internet, a local area network, a workstation peer-to-peer network, a direct link network, a wireless network, or any other suitable communication platform. In this manner, management server 110 and host 130 may communicate through the use of a network architecture. In such an embodiment, the network architecture may include, alone or in any suitable combination, a telephone-based network (such as a PBX or POTS), a local area network (LAN), a wide area network (WAN), a dedicated intranet, and/or the Internet. Further, the network architecture may include any suitable combination of wired and/or wireless components and systems. For example, API 111 may facilitate the connection of management server 110 to one or more modulators, demodulators, multiplexers, demultiplexers, network communication devices, wireless devices, antennas, modems, and any other type of device configured to enable data communication via a communication network. Exemplary types of communication by API 111 include a get operation, a set operation, and an alarm, which are described in more detail below.

Monitor module 113 may monitor SAN 140 to determine the status and state of components in SAN 140. For example, monitor module 113 may periodically poll fibre switches contained within SAN 140 to determine if the switches are fully operational. In addition, monitor module 113 may receive alarms and messages from SAN components whenever their status changes (e.g., if a switch fails, the switch may send a Simple Network Management Protocol (SNMP) message to monitor module 113).

Discovery module 115 may perform initial discovery of SAN 140 to determine what components are in SAN 140, including storage module 150. The discovery may be performed using any method available, such as IP discovery, and may form a list of SAN components. Discovery module 115 may perform component discovery either periodically or on demand to update the list of active components in SAN 140. Moreover, discovery module 115 may obtain lists of available components from host 130, secondary management server 120, or any other server.

Topology module 117 may determine a topology of SAN 140. The topology may indicate the configuration of SAN 140. Topology module 117 may use the list of components obtained from discovery module 115 (and updated by monitor module 113) to determine the manner and type of connections and relations between the components in SAN 140. Exemplary network topologies include bus, star, ring, mesh, and tree topologies. Although illustrated as contained within management server 110, topology module 117 may be a separate server.

Path analysis module 119 may analyze the topology, including the connections within SAN 140, to determine a path quality index. The path quality index may be updated periodically, dynamically (e.g., upon receipt of a change notification), or on demand, and may reflect both planned and unplanned outages or failures to components within SAN 140. The path quality index will be described in more detail below with reference to FIG. 2. Although illustrated as contained within management server 110, path analysis module 119 may be a separate server.

Secondary management server 120 may include one or more modules designed to establish quality monitoring for path selection. For example, secondary management server 120 may include a storage resource management (SRM) module 121 and a planning module 123. An example of SRM module 121 is EMC Control Center, commercially available from EMC Corporation of Hopkinton, Mass. Planning module 123 may be any type of management module that allows network administrators to establish criteria for path selection and SAN management. For example, a network administrator may use planning module 123 to indicate a priority of data to be sent through the network. Secondary management server 120 may include additional components and database management tools for monitoring the status of SAN 140 as well as additional SANs to which secondary management server 120 may be connected.

Host 130 may be any type device for communicating with management server 110 and storage 150 over direct links and SAN 140. For example, host 130 may be a personal computer, a handheld device, a server, or any other appropriate computing platform or device capable of exchanging data with SAN 140. Host 130 may include similar hardware components as described above with respect to management server 110 (e.g., a processor, storage, I/O devices, etc).

Host 130 may include path management software 135 that provides an automated path selection tool. Host 130 may monitor the load on paths between host 130 and storage 150 and report the load to management server 110. A load may refer to an amount of available bandwidth that is used for a given path. Management server 110 may request the load from host 130 using, for example, a "get" request. Host 130 may also store a list of components within SAN 140 that management server 110 may request.

Host 130 may send data to storage 150 and receive data from storage 150. This data may be classified into different priorities based on, for example, how important the data is and whether the data is time-sensitive. A network administrator may configure the data priority using management server 110, secondary management server 120, or host 130. Alternatively, a software developer may indicate priority of data generated by the software application, and host 130 may read the priority from the software application while executing it. For example, data for updating a database in storage 150 that other users may access may have a higher priority than data sent to storage 150 to log the status of executing an application.

Host 130 may execute program modules that provide one or more graphical user interfaces (GUIs) for interacting with management server 110. Users may access management server 110 via SAN 140 through a web browser or software application running on, for example, host 130 or secondary management server 120. For example, a web portal may include options for allowing a user to log onto a secure site provided by management server 110 by supplying credentials, such as a username and a password. Once logged onto the site, the web portal may display a series of screens prompting the user to make various selections for monitoring paths and selecting a path through which to send data in SAN 140. Since embodiments of the present invention may be implemented using an HTTPS (hypertext transfer protocol secure) environment, data transfer may occur in a secure fashion.

Consistent with an aspect of the present invention, a web interface generated by management server 110 that is displayed to users of host 130 may provide various options. For example, a user may select, using the web interface, a path selection tool for initiating a path selection policy that modifies path selection parameters based on path quality considerations. In other embodiments, users of host 130 may access the path selection tool from a GUI generated by an application executing on host 130.

Path management software 135 may automatically select a path through which to send data in SAN 140 based on path selection policy that will consider, for example, a path quality index received from management server 110, the priority of the data to be sent, and the current and projected loads on the available paths for routing data in SAN 140. The process of selecting a path through which to send data will be described in more detail with reference to FIG. 2 below.

Storage 150 may be connected to SAN 150 via ports and may include an array controller, one or more disk drives, and one or more disk enclosures. Each of the disk drives may be uniquely identified to indicate an address for sending and receiving data within SAN 140. Storage 150 may communicate with other devices using various protocols, such as the SCSI command protocol over a Fibre Channel link to SAN 140.

To implement the path selection tool, host 130 may include instructions in the form of one or more software modules that may be written using any known programming language, such as C++, XML, etc. The software may be stored as program code instructions on a computer readable medium (not shown) on management server 110, secondary management server 120, and host 130. In one embodiment, host 130 stores instructions of path management software 135 which, when executed by a processor, perform the functions of the path selection tool.

Process for Selecting a Path

Figure 2:
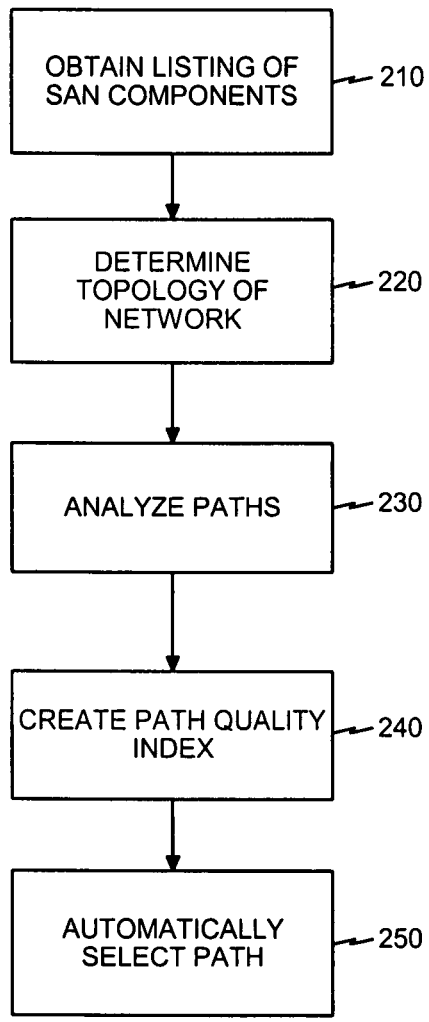
FIG. 2 is a flow diagram of an exemplary method for selecting a path through which to send data in a network, consistent with an embodiment of the present invention.

Referring now to FIG. 2, a flow diagram 200 is provided of an exemplary method for selecting a path through which to send data in a network, consistent with an embodiment of the present invention. The method describes a process for selecting a path through which to send data based on a topology of a network, an analysis of paths in a network, and a path quality index.

In step 210, management server 110 may obtain a listing of SAN components using discovery module 115, as described above. Alternatively, or in addition to using discovery module 115, management server 110 may obtain a listing of SAN components from secondary management server 120 or host 130. Management server 110 may update the listing of components periodically, dynamically, or on demand using monitor module 113, as described above.

Next, management server 110 may determine a topology of the network based on the listing of SAN components, as described above (Step 220). For example, management server 110 may receive a list of components from host 130 that includes all SAN components and how those components are connected. A network administrator may design and store the topology when installing components on SAN 140. Alternatively, management server 110 may automatically discover the topology of the network using, for example, ping queries, domain name server queries, SNMP, traceroute tools, and any other suitable method for determining a network topology.

In step 230, management server 110 may analyze the paths using one or more factors to identify the characteristics of the paths that are available for sending data. Exemplary factors include a resiliency of the paths, a redundancy of the paths, a number of connections in the paths, a quality of the paths, and a cost of using the paths.

Resiliency may refer to the redundancy offered by the SAN products in the paths. When designing a network, the network administrator may use SAN products that are more or less likely to fail depending on the importance of the network connection. The SAN products may be divided into classes depending on their redundancy. Exemplary classes include high-end, middle level, and low-end. A high-end SAN product may include redundant components that are designed to reduce the risk of failure when an error occurs. For example, a fibre channel switch within a SAN may have dual power supply systems and a battery to ensure that the fibre channel switch will continue to operate during a power failure. High-end SAN products may be used for portions of the network that are critical to the operation of the network or the enterprise using the network. For example, a customer facing production environment and the environment used by a enterprise's internal Research and Development (R&D) department may be different. Specifically, switches within the environment used by the R&D department may be high-end to ensure access to the network even during power outages. On the contrary, switches within the customer facing production environment may be of a middle level or a low-end. Middle level SAN products may provide less redundancy, such as a dual power supply switch without a battery backup. Low-end SAN products may be used for less important network connections and may offer reduced or no redundancy (e.g., a single power supply).

Redundancy of the paths may refer to the underlying redundancy of the SAN. SAN connections may not only include the components of the SAN, but also components that provide connection to other networks. For example, a SAN may include a gateway that connects to an IP network and the Internet. Paths in the SAN that include a connection to this Internet gateway may have reduced redundancy because the network administrator does not control the types of components that are used in the Internet. Therefore, rather than routing the data through the Internet gateway and back into the SAN, the automatic path selection tool may prefer to use only connections internal to the SAN. In addition, the automatic path selection tool may analyze the redundancy of paths within the SAN. For example, one path may use a single trunk switch, and another path may use a multiple trunk switch that offers better redundancy. In this manner, paths with more re-routing connections have a higher redundancy because these paths are more likely to successfully transmit data in the event of a failure.

The automatic path selection tool may also analyze the number of connections in paths. Paths that include more connections between more components are more likely to fail because each component is a potential point of failure. As discussed above, if the path includes a connection to an Internet gateway, this path may include tens of thousands of connections, each of which could cause a failure and result in the data not reaching its destination. The number of connections may be counted based only on the number of components, based on the number of components that do not offer automatic re-routing (e.g., single trunk switches), or based on any combination of these as determined by a network administrator.

The automatic path selection tool may also analyze a quality of paths. The quality of the paths may account for load balancing and identify the bandwidth available for each path. The quality of paths may also be projected based on future or scheduled usage of bandwidth in the paths. The load applied to each path may be sent to the management server from the host in real-time to ensure that paths are selected based on the most accurate data.

The automatic path selection tool may further analyze a cost of paths. Sending data through different paths may cost different amounts of money. The cost of paths may be affected by whether the components in the path are owned or leased. Leased components may charge a monthly fee based on the amount of data sent using the component. The cost of paths may be input by a network administrator using a graphical user interface and may be updated on demand, such as when the network administrator replaces a leased component with an owned component.

These factors may be weighted by a network administrator to indicate the importance of these factors to the SAN. For example, some network administrators may have a small budget, so the cost of the paths may be an important factor. Other network administrators may require high redundancy to ensure that all data properly reaches the target. The network administrator may dynamically assign a weight to each factor using, for example, a graphical user interface provided by host system. The weights may be a numerical range (e.g., 0 to 100, with 100 indicating the highest weighted factor) or using a scale (e.g., least important to most important).

Returning to flow diagram 200, management server may create a path quality index using the topology and the results of analyzing the paths (Step 240). The path quality index may indicate the quality of paths using any suitable technique. For example, the path quality index may include a sorted list ranking each path, or each path may be labeled with a ranking, such as "gold," "silver," or "bronze," to indicate which paths should be selected for routing data. Management server 110 may send the path quality index to the host 130 periodically or on demand using, for example, a "set" operation. The path quality index may change as results of analyzing the factors change. For example, if a network administrator modifies the weighting for a factor, the path quality index may update to reflect these changes.

Next, in step 250, host 130 may automatically select a path through which to send data. The path may be selected based on one or more of the path quality index, the current and projected loads on paths, and data priority. The host may determine the current loads on paths by monitoring the paths. The host may determine the projected load on paths by analyzing the amount of time before completing current data transmissions on a path and the number and size of data transmissions that are queued for those paths.

Data priority may refer to the importance of sending the data. For example, some applications may send data that has a high priority and must be sent quickly and reliably. Accordingly, the automatic path selection tool may send this data using a path that has a high path quality index and a relatively low current and projected load. However, other data may have a lower priority and may be sent using a path that has a lower path quality index and/or a higher current and projected load. The automatic path selection tool may select paths having a lower path quality index even though other paths having a higher path quality index are available. In this manner, the automatic path selection tool may ensure that preferred paths are available for sending data with a higher priority.

When selecting a path, the automatic path selection tool may set paths in different modes based on the path quality index, the weighting of the factors for analyzing paths, and the load on the paths. Exemplary modes include active, standby, and automatic standby. An active path may be a path that is available for use, that is, the path has a sufficiently high path quality index. A standby path may be a path that should only be used when no active paths are available. An automatic standby path may be a path that is automatically transitioned from active to standby mode by the host-based path selection tool based on considerations such as error and latency monitoring or a change in its path quality index.

For example, paths may transition to standby mode if load monitoring of the path indicates a defined percentage (e.g., 5%) of data sent using that path fails to reach the target. In addition, the automatic path selection tool may place paths in standby mode if the paths begin to provide a slow response. The path selection tool will not select a path in standby mode for data transmission unless all active paths in SAN 140 are unavailable.

The modes for paths may be updated dynamically based on the path quality index, current network conditions (e.g., load monitoring), and input from a network administrator. Although these exemplary path modes have been described, additional path modes may be used in selecting a path through which to send data in a network. Furthermore, a network administrator may review the statistics generated by the automatic path selection tool and modify the path selection parameters or change path modes.

Accordingly, systems and methods consistent with the present invention provide a tool for selecting a path through which to send data. The system includes a storage area network (SAN), a host, a storage module, and one or more management servers.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer readable media, such as secondary storage devices, for example, hard disks, floppy disks, or CD ROM, the Internet or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A system for selecting a path through which to send data in a storage area network, the system comprising:
   a management server configured to:
   determine a topology of the storage area network, analyze a plurality of paths for sending data through the storage area network, and generate a path quality index based on the topology of the storage area network determined and the analyzing of the plurality of paths, the path quality index indicating a quality of individual paths within the plurality of paths; and a host configured to:
   receive the path quality index from the management server; wherein the management server is configured to analyze a plurality of paths comprises the management server being configured to analyze the plurality of paths by analyzing a plurality of factors, the factors comprising a resiliency of a path, a redundancy of a path, a number of connections in a path, a quality of a path, and a cost of using a path, wherein the management server is further configured to analyze the resiliency factor by determining the class of storage area network products within a path; and automatically select a path from the plurality of paths through which to send data based on the path quality index.

2. The system of claim 1, wherein the host is further configured to select the path through which to send the data based on a priority of the data and based on a load on the path.

3. The system of claim 1, wherein the factors are dynamically weighted.

4. The system of claim 1, wherein the host is further configured to automatically select the path by setting a path in at least one of a standby mode and an active mode.

5. The system of claim 4, wherein the host is further configured to:
set a first path in standby mode,
receive an updated path quality index from the management server,
set, based on the updated path quality index, the first path in the active mode, and
select the first path for sending the data.

6. A method for selecting a path through which to send data in a storage area network, the method comprising:
determining a topology of the storage area network; analyzing a plurality of paths for sending data through the storage area network; generating a path quality index based on the topology of the storage area network determined and the analyzing of the plurality of paths, the path quality index indicating a quality of individual paths within the plurality of paths;
automatically selecting a path from the plurality of paths through which to send data based on the path quality index;
wherein analyzing the plurality of paths comprises analyzing a plurality of factors, the factors including a resiliency of a path, a redundancy of a path, a number of connections in a path, a quality of a path, and a cost of using a path; and
wherein analyzing the resiliency factor comprises determining the class of storage area network products within a path.

7. The method of claim 6, further comprising selecting the path through which to send the data based on a priority of the data and based on a load on the path.

8. The method of claim 6, wherein analyzing a plurality of factors comprises analyzing a plurality of that are dynamically weighted.

9. The method of claim 6, wherein automatically selecting comprises selecting a path in at least one of a standby mode and an active mode.

10. The method of claim 9, further comprising:
setting a first path in standby mode;
generating an updated path quality index;
setting, based on the updated path quality index, the first path in active mode; and
selecting the first path for sending the data.

11. A non-transitory computer-readable medium comprising programmable instructions adapted to perform a computer-implemented method for selecting a path through which to send data in a storage area network, the method comprising: determining a topology of the storage area network; analyzing a plurality of paths for sending data through the storage area network; generating a path quality index based on the topology determined and the analyzing of the plurality of paths, the path quality index indicating a quality of individual paths within the plurality of paths;
automatically selecting a path from the plurality of paths through which to send data based on the path quality index;
wherein analyzing the plurality of paths comprises analyzing a plurality of factors, the factors including a resiliency of a path, a redundancy of a path, a number of connections in a path, a quality of a path, and a cost of using a path; and
wherein analyzing the resiliency factor comprises determining the class of storage area network products within a path.

12. The computer-readable medium of claim 11, wherein the method further comprises selecting the path through which to send data based on a priority of the data and based on a load on the path.

13. The computer-readable medium of claim 11, wherein automatically selecting comprises setting a path in at least one of a standby mode and an active mode.

14. The computer-readable medium of claim 13, wherein the method further comprises:
setting a first path in standby mode;
generating an updated path quality index;
setting, based on the updated path quality index, the first path in active mode; and
selecting the first path for sending the data.

* * * * *